Feb. 23, 1971 T. W. ALTON 3,565,728
METHOD AND APPARATUS FOR FORMING A CONTINUOUS ASSEMBLY OF
ARTICLES IN OVERLAPPING AND INTERCONNECTED FORM
Filed May 9, 1968 4 Sheets-Sheet 1
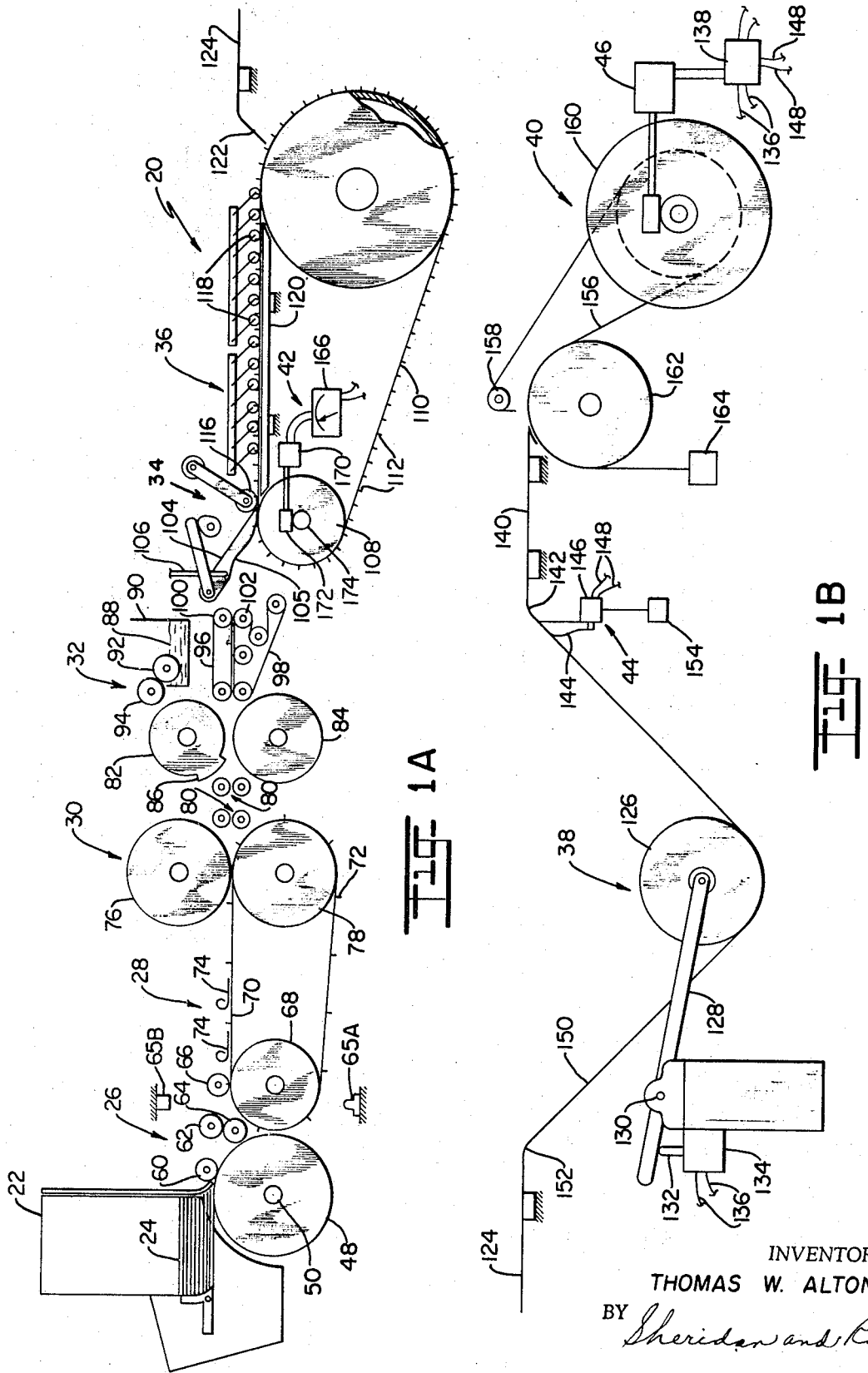
INVENTOR.
THOMAS W. ALTON
BY *Sheridan and Ross*
ATTORNEY

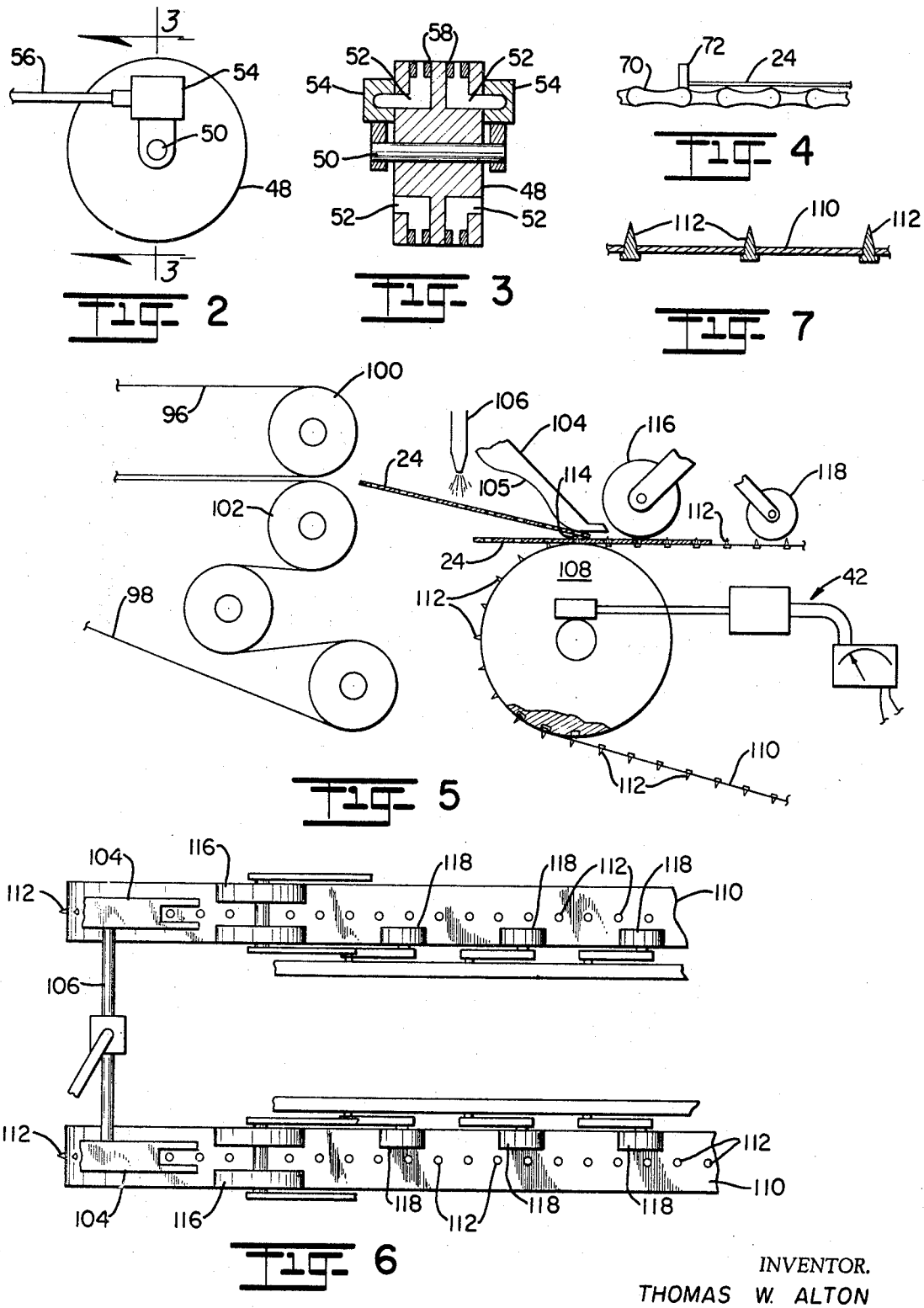

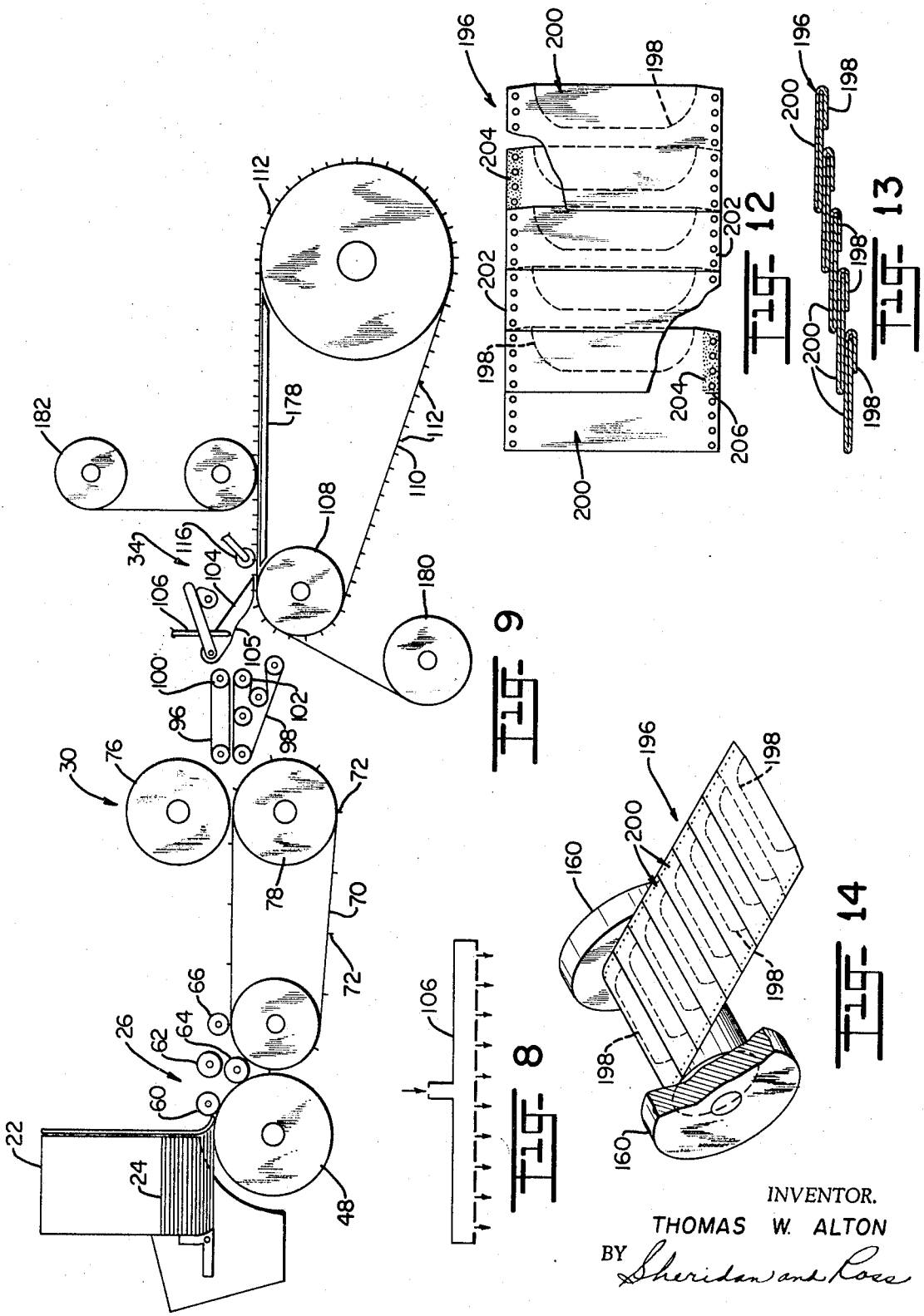

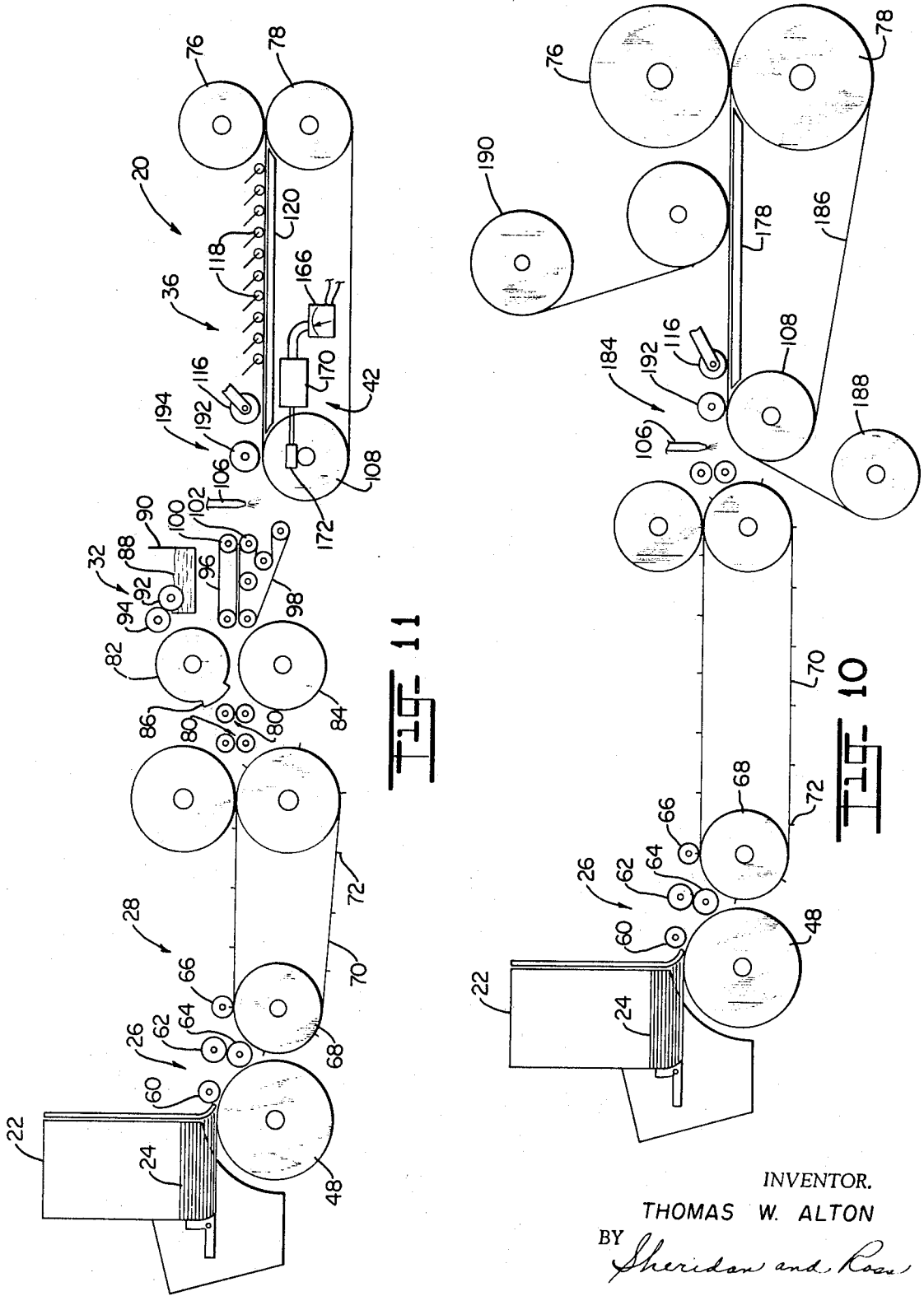

United States Patent Office 3,565,728
Patented Feb. 23, 1971

---

3,565,728
METHOD AND APPARATUS FOR FORMING A CONTINUOUS ASSEMBLY OF ARTICLES IN OVERLAPPING AND INTERCONNECTED FORM
Thomas W. Alton, Phoenix, Ariz., assignor to Pak-Well Corporation, Denver, Colo., a corporation of Colorado
Filed May 9, 1968, Ser. No. 727,776
Int. Cl. B32b *31/10*
U.S. Cl. 156—566     16 Claims

ABSTRACT OF THE DISCLOSURE

Apparatus for forming a continuous assembly of generally flat-type articles, such as envelopes, in overlapping, interconnected form, which assembly is particularly suited for processing through high speed printing apparatuses. The articles are fed along a pathway until each article has its leading portion in overlapping relation with respect to the trailing portion of a preceding article, using adhesive means to secure said article to the preceding article only along marginal portions thereof, and packaging the assembly. Marginal portions of the articles are perforated and the relative constant speeds of travel of the articles prior and subsequent to assembly thereof are controlled in such manner to cause an article to overlap, by a predetermined amount, the adjacent article downstream of same. Since one of the principal purposes of the marginal portions is to properly space the articles of the web while being fed through the printing apparatus, and which are thence removed to separate same, the adhesive means is applied only to areas of the marginal portions so that the articles are not adhesively secured together along transverse areas between the marginal portions.

BACKGROUND OF THE INVENTION

This invention has for its purpose to produce in an efficient and economical manner large quantities of generally flat-type items, such as envelopes, adapted for processing through high speed printer output units of data processing computer equipment. The method and apparatus of this invention is ideally suited for producing the envelope assembly shown in U.S. Patent application Ser. No. 608,631, filed Jan. 11, 1967.

At the present time there are approximately 60,000 computers in operation in the United States and by 1975 it is estimated that there will be approximately 70,000 computers in operation. It is generally recognized that the computer can be used for economical and efficient printing of a large number of different items where only a very small number of copies of each item is required such as occurs in the addressing of envelopes, statements and the like. Notwithstanding the large number of computers in operation today, the use of computers to perform the printing operation as aforedescribed, particularly in addressing envelopes, has been limited by the relatively high cost of envelopes in continuous form and the time involved in processing same through the printer. Through the use of the method and apparatus of this invention, it has been found that the cost of producing generally flat-type articles in continuous form has been reduced by approximately 25 percent as compared with the cost of such articles made in continuous form by prior art methods and apparatuses. Additionally, the use of computers in printing a large number of different items as aforesaid has been further enhanced by using the continuous assembly of items made in accordance with the method and apparatus of this invention since the amount of skip or slew time heretofore experienced in using continuous assemblies made by prior art methods and apparatuses have been substantially reduced.

SUMMARY OF THE INVENTION

The apparatus of this invention comprises a feed path, feed means for sequentially feeding articles to said feed path, adhesive applying means positioned for applying adhesive means along at least a part of the margins of each article as each article travels along said feed path, assembly forming means including means for positioning the leading portion of each article traveling along said feed path in overlapping, contacting relation with respect to the trailing portion of the preceding article fed along said path to secure the overlapping portions together, and means for packaging in roll form the assembly formed in said apparatus. The apparatus also includes means positioned to perforate the margins of the article as same travels along the feed path, and means for controlling the speed of travel of the articles contained within the assembly formed in said assembly forming means relative to the speed of travel of articles traveling in the feed path upstream of the assembly forming means thereby insuring that each article fed into said assembly forming means overlaps the previous article fed to said assembly forming means by a predetermined amount.

One of the principal objects of this invention is to provide an improved apparatus for producing a continuous assembly of generally flat-type articles, such as envelopes, in overlapping, interconnected form.

Another object of this invention is to provide apparatus for producing quickly, efficiently and economically a continuous assembly of generally flat-type articles in overlapping, interconnected form wherein each article has a portion thereof disposed in overlapping relation with respect to a portion of the preceding article contained within said assembly.

Another object of this invention is to provide apparatus for producing in roll form a continuous assembly of generally flat-type items, such as envelopes.

Another object of this invention is to provide apparatus for forming a continuous assembly of generally flat-type articles in overlapping, interconnected form wherein each article has spaced-apart margins and a leading and trailing portion, said assembly being produced by sesquentially feeding articles along a pathway until each article has its leading portion disposed in overlapping relation with respect to the trailing portion of the preceding article, using adhesive means to secure each article to the preceding article along the margins thereof to form said assembly, and packaging said assembly in roll form.

Another object of this invention is to provide apparatus as aforedescribed further including marginally punching of the articles contained within said assembly.

Another object of this invention is to provide a method and apparatus as aforedescribed involving controlling the speed of travel of the articles disposed in overlapping relation relative to the speed of travel of each article being fed to said overlapped articles to insure that each article overlaps the preceding article by a predetermined amount.

Another object of this invention is to provide apparatus as aforedescribed involving the application of a strip of adhesive tape along the margins of the article disposed in overlapping relation.

Another object of this invention is to provide apparatus for forming a continuous assembly of generally flat-type articles in overlapping, interconnected form, each article having removable, spaced apart margins and a leading and a trailing portion, comprising means for sequentially feeding the articles along a pathway, applying adhesive means along at least a portion of said removable margins, forming said assembly by positioning each article relative to the preceding article whereby the leading portion thereof overlies and is secured by said adhesive means to the trailing portion of the preceding article, controlling the speed of travel of each article being fed to said assembly whereby the leading portion of each article overlaps the trailing portion of each article by a predetermined amount performing the removable margins of the articles contained within said assembly, and packaging said assembly in roll form.

BRIEF DESCRIPTION OF THE DRAWINGS

The foregoing and other objects will become apparent from the specification and drawings in which:

FIG. 1A is a cross-sectional, elevational view in schematic showing a portion of an apparatus constructed in accordance with the subject invention;

FIG. 1B is a cross-sectional, elevational view in schematic showing the remaining portion of an apparatus constructed in accordance with the subject invention;

FIG. 2 is a side elevational view of the vacuum feed vessel used in removing articles one at a time from the hopper means;

FIG. 3 is a cross-sectional view taken along line 3—3 of FIG. 2;

FIG. 4 is a side elevational view of a portion of one of the endless belts used in the aligner and spacer means;

FIG. 5 is an enlarged cross-sectional, elevational view in schematic form showing a portion of the assembly forming means;

FIG. 6 is a plan view generally of the portion of the apparatus shown in FIG. 5 with some parts shown in their entirety and with the articles being omitted for purposes of clarity;

FIG. 7 is a cross-sectional, elevational view of a portion of the pin tape shown in FIG. 5;

FIG. 8 is an enlarged front elevational view of the conduit 106 shown in FIG. 5;

FIG. 9 is a cross-sectional, elevational view in schematic of another embodiment of a portion of an apparatus constructed in accordance with this invention;

FIG. 10 is a cross-sectional, elevational view in schematic of still another embodiment of a portion of an apparatus constructed in accordance with the subject invention;

FIG. 11 is a cross-sectional, elevational view in schematic of still another embodiment of a portion of an apparatus constructed in accordance with the subject invention;

FIG. 12 is a top view, partially broken away, of a portion of a continuous assembly of envelopes constructed in accordance with the method and apparatus of this invention;

FIG. 13 is a cross-sectional view, greatly enlarged particularly from a thickness standpoint, taken along line 13—13 of FIG. 12; and FIG. 14 is a perspective view of a continuous assembly of envelopes packaged in roll form on a spool.

DESCRIPTION OF THE PREFERRED EMBODIMENTS

Referring now to the drawings, in FIGS. 1–8 is shown one embodiment of an apparatus, indicated generally by the numeral 20, constructed in accordance with the subject invention. The apparatus 20 comprises a hopper means 22 for receiving therein generally flat-type articles 24 which are to be processed through the apparatus 20, a feed path along which the articles are to be processed, feed means 26 for sequentially removing articles 24 from said hopper means 22 and feeding same to said feed path, aligner and spacer means 28 for aligning each article fed to said feed path in a predetermined manner and effecting a predetermined spacing between the articles traveling along said feed path, a punch means 30 positioned to punch or perforate the margins of each article 24 as each article travels along the feed path, adhesive applying means 32 positioned for applying adhesive means along at least a part of the margins of each article as each article travels along the feed path, assembly forming means 34 for positioning each article relative to the preceding article whereby the leading portion (taken with reference to the direction of travel in the feed path) of each article overlies and is secured by adhesive means to the trailing portion of the preceding article fed along said path with at least some of the perforations formed within the margins of each article being coaligned with some of the perforations formed within the removable margins of the preceding article, means 36 for curing the adhesive means applied to each article, means 38 for applying and maintaining a predetermined amount of tension within the assembly of articles formed, and means 40 for packaging into roll form the assemblies so formed. The apparatus shown in FIG. 1 also includes means 42 for controlling the speed of travel of articles contained within the assembly formed in the assembly forming means 34 relative to the speed of travel of the articles in the feed path upstream of the assembly forming means 34 thereby insuring that each article fed to the assembly forming means 34 overlaps the previous article fed to the assembly forming means by a predetermined amount. The apparatus shown in FIG. 1 also includes a discontinuity presence sensing means 44 for sensing between the assembly forming means 34 and the packaging means 40 the existence of a discontinuity in an assembly formed within the apparatus 20 and for generating a signal in response thereto, the signal being used to control the speed of the motor 46 operating the packaging means 40.

Referring again to FIG. 1, the apparatus 20 shown therein will now be described in more detail. The hopper means 22 is a conventional hopper means constructed for receiving and storing therein a plurality of articles in a suitable manner to permit removal of the articles one at a time from the bottom thereof. Hopper means 22 is positioned above a vacuum wheel 48, see also FIGS. 2 and 3. The vacuum wheel 48 is mounted upon an axle or shaft 50 for rotation therewith. The vacuum wheel 48 has four right-angled passageways 52 formed therein, see FIG. 3, each of which has one end thereof disposed in communication with the circumference of the vacuum wheel 48 and of the other end thereof disposed in communication with one of the side surfaces of said wheel 48. One pair of the passageways 52 is displaced angularly approximately 180 degrees from the other pair of passageways 52. The vacuum wheel 48 is mounted between a pair of boxes 54. Each of the boxes 54 is stationarily disposed with respect to the vacuum wheel 48 and is mounted to a vacuum source (not shown) by conduit 56. Due to this arrangement, each time the vacuum wheel completes one revolution, each pair of passageways 52 will be disposed in communication with the boxes 54 thereby permitting a vacuum to be applied to the lower surface of the lower most article 24 disposed within the hopper means 22. Each passageway 52 preferably has a hollow rubber plug 58 mounted therein as shown in FIG. 3. As the lowermost article 24 is moved to the right as viewed in FIG. 1, said article is fed between vacuum wheel 48 and roller 60 and thence driven forwardly between cooperating rollers 62 and 64. After passing through cooperating rollers 62 and 64, the article 24 is fed between a pair of rollers 66 and 68, actuates a counter means comprising a light source 65A and light sensing cell 65B by interrupting a beam of light being transmitted from said source 65A to said cell 65B, and is then deposited upon a pair of endless belts 70 (only one of which is shown), see also FIG. 4. Each belt 70 has securely mounted thereon a tab portion 72 which is constructed for projecting or extending intermittently into the feed path. Each tab 72 mounted upon one of the belts 70 is transversely aligned with a corresponding tab 72 mounted upon the other belt 70 (not shown). The tabs 72 are spaced from adjacent tabs by a predetermined distance. As shown in FIGS. 1 and 4, the tabs 72 are constructed to engage the trailing edge of an article 24 which is being processed through the apparatus. Downstream of the cooperating rollers 66 and 68 are members 74 each of which is biased downwardly toward the feed path for frictionally engaging each article as same is processed along said feed path. The biased members 74 cooperate with the tabs 72 to insure that each article is aligned with respect to the feed path in a predetermined manner, i.e., to prevent the article from being positioned askew as same travels along the feed path. Due to the spacing of the tabs 72 in the manner as aforedescribed, each article 24 will be linearly spaced from each preceding article 24 by the amount of longitudinal spacing existing between adjacent tabs 72. The endless belts 70 and their tabs 72 carry each article between male and female punches 76 and 78. The male and female punches 76 and 78 are suitably positioned to perforate the margin of each article 24 as same passes therebetween.

Following the punching or perforating operation, each article passes between one or more pair of friction rollers 80 and thence between cooperating rollers 82 and 84, said rollers 82 and 84 cooperating to apply adhesive means along at least a part of the margins of each article 24 passing therebetween. It will be noted that roller 82 has a radially extending portion 86 upon which is deposited a suitable liquid adhesive means 88 which is contained within container 90. The adhesive means 88 is transferred from the container 90 to the radially extending portion 86 by cooperating rollers 92 and 94. As is conventionally the case where it is desired to deposit adhesive means along parts of the space-apart margins of each article 24, a pair of cooperating rollers 82 and 84 will be used, said cooperating rollers 82 and 84 being suitably spaced apart in order that the radially extending portion 86 and one of the rollers 82 will engage one of the margins of the article 24 while the radially extending portion 86 and the other roller 82 will engage the other margin of article 24.

Following the application of the adhesive means as aforedescribed, the article then passes between a pair of conveyor belts 96 and 98. As soon as the trailing edge of the article exits from between the rollers 100 and 102, the article is moved downwardly as a result of the combined action of the downward pivotal movement of member 104 and an impulse of pressurized gas which is emitted from transversely extending conduit 106. As shown in FIG. 1, the member 104 is cam actuated to pivot toward and away from roller 108. The lower surface of member 104 is arcuately formed as shown at 105 to assist in guiding the leading edge of each article into a proper position. Although not shown, the emission of pressurized fluid from the conduit 106 is similarly cam actuated.

The assembly forming means 34 includes a pair of spaced-apart pin tapes 110 each of which travels about a corresponding roller 108. As shown in FIGS. 5 and 7, the pin tape 110 comprises an endless belt formed from a flexible material, such as a strip of metal, and a plurality of pins 112 riveted or otherwise securely attached thereto and longitudinally spaced therealong. Each pin 112 of each tape 110 is transversely aligned with a corresponding pin 112 on the other tape 110 as shown in FIG. 6. As shown in FIG. 5, positive seating of the leading edge of the article 24 with the leading perforation 114 thereof disposed for positioning about one of the pins 112 is effected by the lower portion of member 104. It will be noted that the elevation of the feed path is lowered vertically at the upper surface of the roller 108 as compared with the upstream portion of the feed path. This has been found to be a very advantageous thing since it enables the leading edge of the article 24 to be disposed at a lower elevation than the trailing edge thereof. As a result of the article 24 approaching the pin tape 110 in this manner, the leading perforation 114 thereof is accurately positioned with respect to a predetermined one of the pins 112 before the lower surface of article 24 comes into contacting engagement with the adhesive means which is disposed along part of the margin portions of the upper surface of the preceding article. Thus, when the article 24 comes into contacting engagement with the preceding article, the article 24 is accurately positioned and aligned and ready to be secured to the preceding article. As the assembly formed in this manner moves to the right, as viewed in FIGS. 1 and 5, the overlapping portions of the articles are urged into contacting engagement with each other by a plurality of rollers 116 and 118, each of said rollers 116 and 118 being biased for movement in a downwardly direction. Curing of the adhesive means is effected by passing same over a pair of electrically heated strips 120. It will be understood that adhesive curing means 36 may be omitted depending upon the type of adhesive means used. After the assembly of articles passes beyond the ends of strips 120, the forward portion thereof moves upwardly along the inclined surface portion 122 of member 124.

Upon the assembly leaving member 124, the assembly passes beneath roller 126 which is a part of the means 38 for applying and maintaining a predetermined tension within the assembly so formed. Roller 126 is connected to a pair of arms 128 which, in turn, are mounted for pivotal movement about a shaft 130. One of the arms 128 extends beyond the shaft 130, see FIG. 1B, and is constructed for engaging a spring biased, movable part 132 of an electric motor speed control element 134. Element 134 is connected by a pair of lines 136 to motor control box 138.

The assembly of articles passes about roller 126 and upwardly over table 140. Attached to a depending portion 142 of table 140 is a spring biased actuating member 144 of a switch 146 which comprises a part of the discontinuity presence sensing means 44. The switch 146 is connected by a pair of lines 148 to the motor control box 136. As long as the actuating member 144 is held in one of two positions by the assembly of articles passing adjacent thereto, the operation and speed of the motor will be controlled by the vertical position of the movable part 132 of the electric motor speed control element 134. However, in the event a portion of the assembly becomes separated from another portion thereof, the actuating member 142 will move outwardly away from the depending portion 142 thereby actuating the switch 146. Actuation of the switch 146 results in shutting off motor 170. If desired or required, actuation of switch 146 may also be used to operate a suitable signal to indicate a discontinuity in the assembly being processed through the apparatus.

Table 140 also provides a surface upon which one portion of the assembly may be "repaired" or attached to another portion of the assembly. For example, in the event a discontinuity occurs in said assembly, an operator may apply adhesive means along the margin portions of the last article contained in the portion of the assembly which has one end thereof wrapped about the spool 160 and then position the leading portion of the article contained in the portion of the assembly which extends underneath roller 126 in overlapping relation with respect to the article to which adhesive means has just been applied and then firmly pressed said adjacent ends into firm bonding engagement. Following this, the operator insures that the freshly bonded portions passes about spool 160 without becoming separated. It will be understood that the freshly applied adhesive means will be suitably cured merely by the passage of time itself.

As shown in FIG. 1, a strip of material 150 extends from the lower surface of depending portion 152 of member 124, passes beneath roller 126 and then passes upwardly through an opening formed in depending portion 142 of table 140. The free end of strip of material 150 is attached to a weight 154. The use of the strip of material 150 is desirable in the production of a continuous assembly of envelopes having a closable flap, since it serves to retain each flap of each envelope in the assembly in a predetermined position.

Another strip of material 156 extends from a member 158 down about the core of the spool 160 thence upwardly around member 162 and then downwardly therefrom. A weight 164 is attached to the end of the strip of material 156 extending downwardly from member 162. The strip of material 156 serves the same general purpose as the strip of material 150 where production of a continuous assembly of envelopes is concerned.

Referring again to FIG. 1, it will be noted that the speed of travel of the articles contained within the assembly formed in the assembly forming means 34 may be controlled relative to the speed of travel of the articles traveling through the feed path upstream of the assembly forming means 34. The speed control means 42 includes a motor speed control box 166 which is used to control the speed of motor 170. As shown in FIG. 1, the motor 170 drives a gear box 172 which, in turn, drives the axle or shaft 174 upon which is mounted rollers 108. Thus, if for any reason it is desired to increase or decrease the speed of travel of the articles contained within the assembly formed in the assembly forming means 34 relative to the speed of the articles traveling in the feed path upstream of the article forming means 34 (such as would be the case where the amount of degree of overlapping has increased or decreased), such can be effected by making a suitable adjustment to the motor speed control box 166.

Although the speed of travel of the articles contained within the assembly formed in the assembly forming means 34 may be controlled as aforesaid, with the arrangement shown in FIG. 1, it has been found desirable to operate all of the components o fthe apparatus between the hopper means 22 and the member 124 from a single driving member. Under these circumstances, the motor 170, the gear box 172 and the motor speed control box 166 are omitted.

In FIG. 9 is shown another embodiment of an apparatus constructed in accordance with the subject invention. The portion of the apparatus shown in FIG. 10 is similar to a like portion of the apparatus as shown in FIGS. 1A and 1B except for the omission of the adhesive applying means 32 shown in FIG. 1 and the cooperating pairs 80 of rollers. In FIG. 9, the assembly of articles is secured together by strips of perforated adhesively coated tape which are applied along the margins of the assembled articles. Additionally, a pair of support members 178 is used in lieu of the electrically heated members 120. A pair of spaced-apart rolls 180 (only one of which is shown) of perforated, adhesively coated tape is positioned to permit strips of perforated adhesively coated tape to be fed along the margins of the lower surfaces of the articles contained within the assembly formed in the assembly forming means 34. A second pair of rolls 182 (only one of which is shown) of perforated, adhesively coated tape is positioned to supply strips of perforated, adhesively coated tape along the margins of the articles contained within the assembly on the upper surface of same assembly. Thus, the apparatus of FIG. 9 is useful in forming a continuous assembly of generally flat-type articles by applying adhesively coated strips along the margins of the articles contained in the assembly formed in the assembly forming means.

In FIG. 10 is shown another embodiment of an apparatus constructed in accordance with the subject invention. The apparatus shown in FIG. 10 is similar to the apparatus shown in FIG. 9 except that the male and female portions 76 and 78 have been moved downstream of the assembly forming means 184, an endless belt 186 has been substituted for the pin tape 110, the rolls 188 and 190 of adhesively coated tape have been substituted for the rolls 180 and 182 of perforated, adhesively coated tape, and a cooperating roller 192 has been substituted for the member 104. As shown in FIG. 10, after the articles contained within the assembly have been secured together by strips of adhesively coated tape, the assembly is passed between the male and female punches 76 and 78 which are positioned to perforate the margins of the articles contained within the assembly.

In FIG. 11 is shown another embodiment of an apparatus constructed in accordance with the subject invention. The apparatus shown in FIG. 11 comprises a hopper means 22, feed means 26 for sequentially removing articles from said hopper means 22 and feeding such articles to said feed path, aligner and spacer means 28 for aligning each article fed to said feed path in a predetermined manner and effecting a predetermined spacing between the articles traveling along said feed path, adhesive applying means 32 positioned for applying adhesive means along at least a part of the margins of each article as each article travels along said feed path, assembly forming means 194, means 36 for curing the adhesive means applied to each article, and punch means positioned to perforate the margins of each article as each article travels along said feed path. Although not shown, the apparatus of FIG. 11 also includes means for applying and maintaining a tension within said assembly and means for packaging said assembly in roll form. Additionally, the apparatus shown in FIG. 11 includes means 42 for controlling the speed of travel of the articles contained within the assembly formed in said assembly forming means 194 relative to the speed of travel of articles traveling in the feed path upstream of said assembly forming means 194.

In FIGS. 12 and 14 is shown a continuous assembly 196 of envelopes constructed in accordance with the method and apparatus of this invention. It will be noted that the sealing flap 198 of each envelope 200 within said assembly 196 is folded to underlie a portion of the respective envelope 200. Each preceding envelope is shown as overlying approximately one-half of the length of the margin portions 202 of each successive envelope. Each envelope 200 within the assembly 196 is secured to the preceding envelope within said assembly by adhesive means 204 (see FIG. 12) disposed between the perforated or aperture portions of the margin portions of the envelopes and forming a secure connection means. FIG. 14 shows a continuous assembly 196 of envelopes as same is being either packaged in roll form upon the spool 160 or removed from said spool 160.

As shown in FIG. 12, each envelope 200 preferably has a line 206 extending inwardly a short distance from at least one of the margin portions. The purpose for marking each envelope in this manner is twofold. First of all, said mark serves as a visible indication as to where the leading edge of each succeeding envelope should be positioned in order to effect and maintain a proper overlapping of each envelope in the assembly being formed. In the event that the leading edge of each successive envelope is positioned either forwardly or rearwardly of said marks, appropriate correction is taken, in case of the apparatuses shown in FIGS. 1 and 11, by increasing or decreasing, respectively, the speed of the motor 170 which drives the rollers 108. Said mark serves an additional purpose since upon separation of one portion of the assembly relative to the other portion thereof, an operator, after applying suitable adhesive means such as a liquid adhesive or adhesively coated tape, repairs the assembly merely by positioning the leading envelope in the upstream portion of the assembly with its leading edge positioned along said mark and then securing together said portions of said assembly through the use of said adhesive means.

In view of the above description, it will be readily obvious that a new and beneficial apparatus for forming a continuous assembly of generally flat-type articles in an overlapping, interconnected form which is particularly suited for processing through high speed printing apparatuses, such as those associated with computers, has been described. The apparatus of this invention enables the formation of a continuous assembly of flat-type articles in precise overlapping, interconnected relationship at the rate of 10,000 to 12,000 articles per hour and faster. This high rate of production has resulted in a substantial reduction in cost of manufacture of such a continuous assembly of flat-type articles. Additionally, the processing of such an assembly through a high speed printing apparatus has substantially reduced the time heretofore required in passing an assembly through a high speed printer and imprinting desired information thereon. The savings in processing time varies between 25 and 50 percent depending upon the number of lines to be printed on each such item. For example, where the addressing of envelopes are involved, the processing rate through the high speed printing apparatus has been approximately doubled thereby resulting in a 50 percent reduction in processing time. Additionally, by controlling the speed of an assembly formed relative to the speed of articles being supplied to such assembly, it has been possible to produce a continuous assembly of flat-type items wherein each item overlaps each preceding item by a predetermined amount within predetermined, accurate tolerances.

From the foregoing, it should be apparent that the subject invention readily accomplishes the heretofore outlined objectives and advantages. It is to be understood, however, that this invention is not limited to the exact methods and embodiments shown and described, which are merely by way of illustration and not apparent to those skilled in the art, and it is therefore intended that the appended claims cover all such changes and modifications.

I claim:

1. An apparatus for forming a continuous assembly of generally flat-type articles in overlapping, interconnected form, each article having removable margins and a leading and a trailing portion, said apparatus comprising: hopper means for receiving therein articles to be processed through the apparatus; a feed path; feed means for sequentially removing articles from said hopper means and feeding such articles to said feed path; aligner and spacer means for aligning each article fed to said feed path in a predetermined manner and effecting a predetermined spacing between the articles traveling along said feed path; punch means positioned to perforate the removable margins of each article as each article travels along said feed path; adhesive applying means positioned for applying adhesive means along only at least a part of the margins of each article as each article travels along said feed path; assembly forming means including means for positioning each article relative to the preceding article whereby the leading portion of each article overlies and is secured by adhesive means to the trailing portion of the preceding article fed along said path with at least some of the perforations formed within the removable margins of each article being co-aligned with some of the perforations formed in the removable margins of the preceding article; means for curing the adhesive means applied to each article; means for applying and maintaining a predetermined amount of tension within the assembly of articles formed; and means for packaging into roll form the assembly so formed.

2. An apparatus as set forth in claim 1 including means for controlling the speed of travel of the articles contained within the assembly formed in said assembly forming means relative to the speed of travel of articles in the feed path upstream of said assembly forming means thereby ensuring that each article fed to said assembly forming means overlaps the previous article fed to said assembly forming means by a predetermined amount.

3. An apparatus as set forth in claim 1 including discontinuity presence sensing means for sensing between said assembly forming means and said packaging means the existence of a discontinuity in an assembly formed within said apparatus and for generating a signal in response thereto, said signal being used to control the operation of said packaging means.

4. An apparatus for forming a continuous assembly of generally flat-type articles in overlapping, interconnected form, each article having removable margins and a leading and a trailing portion, said apparatus comprising: a feed path; feed means for sequentially feeding articles to said feed path; adhesive applying means positioned for applying adhesive means along only at least a part of the margins of each article as each article travels along said feed path; assembly forming means including means for positioning the leading portion of each article traveling along said feed path in overlapping, contacting relation with respect to the trailing portion of the preceding article fed along said path to secure the overlapping portions together; and means for packaging in roll form the assembly formed in said apparatus.

5. An apparatus as set forth in claim 4 including punch means positioned to perforate the margins of each article as same travels along said feed path.

6. An apparatus as set forth in claim 5 including means for controlling the speed of travel of the articles contained within the assembly formed in said assembly forming means relative to the speed of travel of articles traveling in the feed path upstream of said assembly forming means thereby ensuring that each article fed to said assembly forming means overlaps the previous article fed to said assembly forming means by a predetermined amount.

7. An apparatus for forming a continuous assembly of generally flat-type articles in overlapping, interconnected form, each article having removable margins and a leading and a trailing portion, said apparatus comprising: a feed path; feed means for sequentially feeding articles to said feed path; assembly forming means including means for positioning the leading portion of each article traveling along said feed path in overlapping, contacting relation with respect to the trailing portion of the preceding article fed along said path; and means for applying adhesively coated strips along the removable margins of the articles contained within said assembly forming means thereby securing together the articles contained within such an assembly.

8. An apparatus for forming a continuous assembly of generally flat-type articles in overlapping, interconnected form, each article having removable margins and a leading and a trailing portion, said apparatus comprising: a feed path; feed means for sequentially feeding articles to said feed path; adhesive-applying means positioned for applying adhesive means along only at least a part of the margins of each article as each article travels along said feed path; means for positioning the leading portion of each article in overlapping, contacting relation with respect to the trailing portion of the preceding article fed along said path to secure the overlapping portions together; punch means positioned to perforate the margins of articles as said articles travel along said feed path; and means for controlling the speed of travel of the articles contained within the assembly formed in the assembly forming means relative to the speed of travel of articles traveling in the feed path upstream of said assembly-forming means thereby ensuring that each article fed to said assembly forming means overlaps the previous articles fed to said assembly forming means by a predetermined amount.

9. An apparatus as set forth in claim 7 including means for packaging in roll form the assembly formed in said apparatus.

10. An apparatus as set forth in claim 8 including means for packaging in roll form the assembly formed in said apparatus.

11. An apparatus for forming a continuous assembly of generally flat-type articles in overlapping, interconnected form, each article having removable margins and a leading and trailing portion, said apparatus comprising:

a feed path; feed means for sequentially feeding articles to said feed path; punch means positioned to perforate the margins of each article as same travels along said feed path; adhesive-applying means positioned for applying adhesive means along only at least a part of the margins of each article as each article travels along said feed path; and assembly forming means including means for positioning the leading portion of each article traveling along said feed path in overlying, contacting relation with respect to the trailing portion of the preceding article fed along said path to secure the portions together by said adhesive means.

12. Apparatus as set forth in claim 11 including means for controlling the speed of travel of each article being fed to said assembly forming means whereby the leading portion of each article overlaps the trailing portion of each article by a predetermined amount.

13. An apparatus for forming a continuous assembly of generally flat-type articles in overlapping, interconnected form, each article having removable margins and a leading and trailing portion, said apparatus comprising: a feed path, feed means for sequentially feeding articles to said feed path, punch means positioned to perforate the margins of each article as same travels along said feed path; adhesive-applying means positioned for applying adhesive means along only at least a part of the margins of each article as each article travels along said feed path; and assembly forming means including means for positioning one of the portions of each article traveling along said feed path in overlapping, contacting relationship with respect to one of the portions of the preceding article fed along said path to secure the articles together by said adhesive means.

14. An apparatus as set forth in claim 13 including means for controlling the speed of travel of each article being fed to said assembly forming means whereby the leading portion of each article overlaps the trailing portion of each article by a predetermined amount.

15. An apparatus for forming a continuous assembly of generally flat-type articles in overlapping, interconnected form, each article having removable margins and a leading and trailing portion, said apparatus comprising: a feed path; feed means for sequentially feeding articles to said feed path; adhesive-applying means positioned for applying adhesive means only at least a part of the margins of each article as each article travels along said feed path; assembly forming means including means for positioning one of the portions of each article traveling along said feed path in overlapping, contacting relationship with respect to one of the portions of the preceding articles fed along said path to secure the articles together by said adhesive means; and punch means to perforate the margins of the assembled articles as the assembly travels along said feed path.

16. An apparatus as set forth in claim 15 including means for controlling the speed of travel of each article being fed to said assembly whereby the leading portion of each article overlaps the trailing portion of each article by a predetermined amount.

References Cited

UNITED STATES PATENTS

| 1,893,086 | 1/1933 | Keller | 229—69 |
| 2,013,844 | 9/1935 | Sherman | 229—69 |
| 3,028,069 | 4/1962 | Willis | 229—69 |
| 3,200,719 | 8/1965 | Welch | 93—61 |
| 3,327,927 | 6/1967 | Allison et al. | 229—69 |

FOREIGN PATENTS

| 1,045,476 | 6/1953 | France | 229—69 |

VERLIN R. PENDEGRASS, Primary Examiner

U.S. Cl. X.R.

156—253, 519, 552; 229—69